(12) United States Patent
Laine et al.

(10) Patent No.: US 10,178,372 B2
(45) Date of Patent: Jan. 8, 2019

(54) LONG FOCAL LENGTH MONOCULAR 3D IMAGER

(71) Applicant: The Charles Stark Draper Laboratory, Inc., Cambridge, MA (US)

(72) Inventors: Juha-Pekka J. Laine, Boston, MA (US); Scott A. Rasmussen, Andover, MA (US); Francis J. Rogomentich, Wilmington, MA (US); Robert A. Larsen, Somerville, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 432 days.

(21) Appl. No.: 13/776,008

(22) Filed: Feb. 25, 2013

(65) Prior Publication Data

US 2013/0314509 A1    Nov. 28, 2013

Related U.S. Application Data

(60) Provisional application No. 61/651,910, filed on May 25, 2012.

(51) Int. Cl.
*H04N 13/218* (2018.01)
*G02B 23/18* (2006.01)

(52) U.S. Cl.
CPC ........... *H04N 13/218* (2018.05); *G02B 23/18* (2013.01)

(58) Field of Classification Search
None
See application file for complete search history.

(56) References Cited

U.S. PATENT DOCUMENTS

| 3,055,265 | A | * | 9/1962 | Smith | G03B 37/04 352/239 |
| 4,009,951 | A | * | 3/1977 | Ihms | G03B 35/18 352/58 |
| 4,844,583 | A | * | 7/1989 | Lo | G03B 35/10 359/464 |
| 4,911,530 | A | * | 3/1990 | Lo | G03B 35/10 359/464 |
| 5,341,168 | A | * | 8/1994 | Hernandez | H04N 13/0059 348/42 |

(Continued)

FOREIGN PATENT DOCUMENTS

| EP | 1544666 A1 | | 6/2005 | |
| JP | 10-105692 | * | 4/1998 | ............... G06T 1/00 |

OTHER PUBLICATIONS

International Search Report and Written Opinion for International Patent Application No. PCT/US2013/027629, dated May 24, 2013 (10 pages).

(Continued)

*Primary Examiner* — Hung Q Dang
(74) *Attorney, Agent, or Firm* — Lando & Anastasi, LLP

(57) ABSTRACT

An optical assembly for three-dimensional image capture includes first and second optical channels that are fixed with respect to one another. Each channel is configured to direct light onto at least a portion of an image sensor. The first and second optical channels each include an aperture for receiving the light, an objective lens for focusing the light into an intermediate image on an intermediate image plane, and an eyepiece lens for collimating the intermediate image.

23 Claims, 4 Drawing Sheets

(56) References Cited

U.S. PATENT DOCUMENTS

| | | | | |
|---|---|---|---|---|
| 5,548,362 | A * | 8/1996 | Wah Lo | G03B 35/10 396/326 |
| 5,570,150 | A * | 10/1996 | Yoneyama | G03B 35/10 348/E13.007 |
| 5,852,291 | A * | 12/1998 | Thomas | 250/214 VT |
| 6,394,602 | B1 * | 5/2002 | Morrison et al. | 351/206 |
| 2005/0088762 | A1 | 4/2005 | Ohashi | |
| 2011/0122233 | A1 * | 5/2011 | Kasai et al. | 348/49 |
| 2011/0164108 | A1 * | 7/2011 | Bates et al. | 348/36 |
| 2014/0085446 | A1 * | 3/2014 | Hicks | 348/62 |

OTHER PUBLICATIONS

Alabaster, J., (2012) "Fujitsu Releases Platform to Let Standard Mobile Cameras Take 3D Pictures, Video", IDG News Service, article dated May 2, 2012, Retrieved from the internet on Feb. 22, 2013: <http://www.pcworld.com/article/254830/fujitsu_releases_platform_to_let_standard_mobile_cameras_take_3d_pictures_video.html> (1 page).

Fujitsu Limited, (2012) "Fujitsu Develops Technology Enabling Stereoscopic 3D Image Recording with a Simple Attachment on Existing Mobile Phones and Smartphones: Easy-to-view 3D images via a compact attachment and cloud-based image processing", *Fujitsu*, article dated Apr. 26, 2012, Retrieved from internet on Feb. 22, 2013: <http://www.fujitsu.com/global/news/pr/archives/month/2012/20120426-01.html> (3 pages).

\* cited by examiner

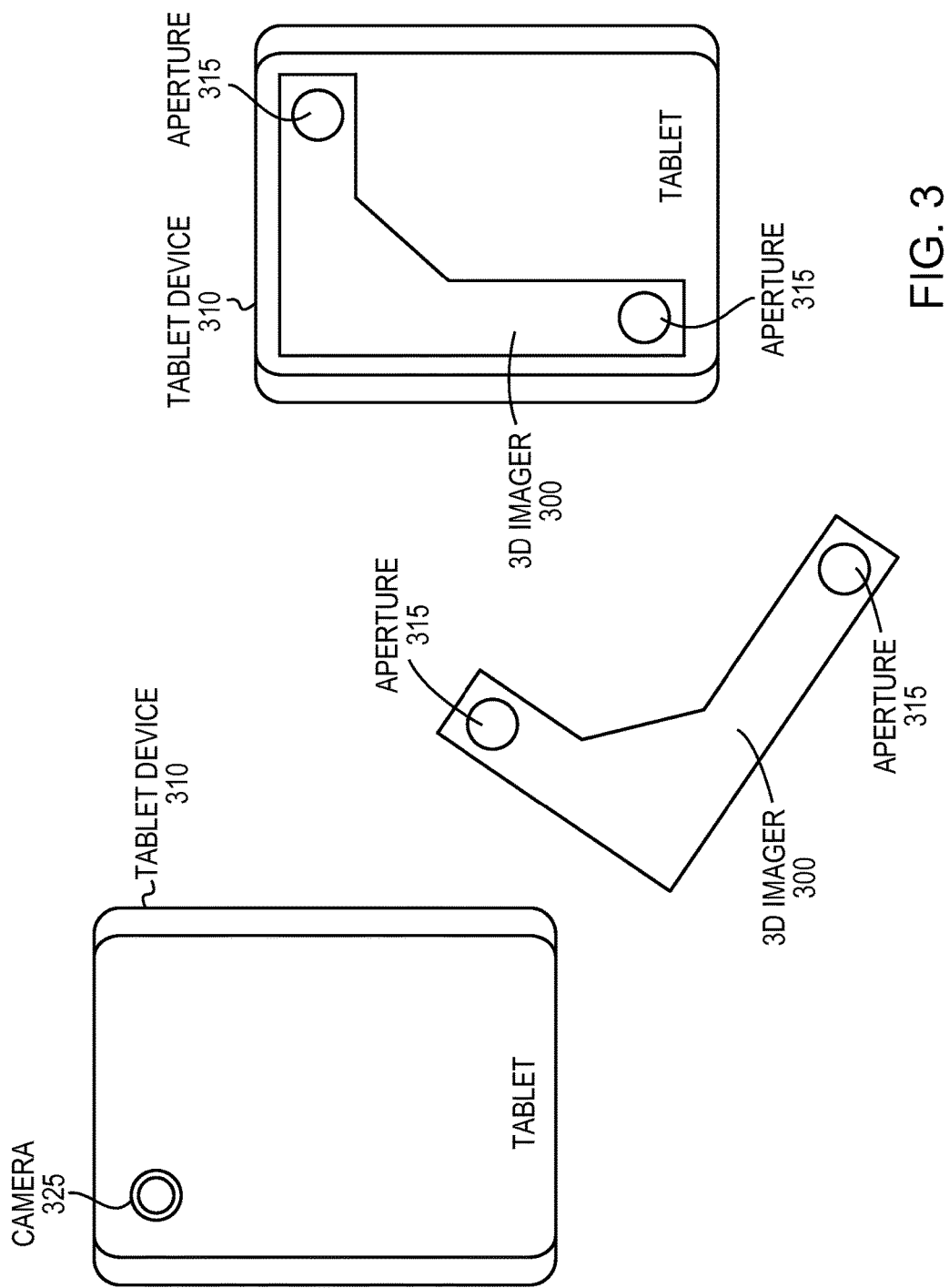

LONG FOCAL LENGTH MONOCULAR 3D IMAGER

CROSS-REFERENCE TO RELATED APPLICATION

This application claims priority to and the benefit of U.S. Provisional Patent Application No. 61/651,910, filed May 25, 2012, and entitled "Long Focal Length Monocular 3D Imager," the entirety of which is hereby incorporated herein by reference.

TECHNICAL FIELD

In various embodiments, the present invention relates to improved systems and methods for adapting conventional digital imagers for use as three-dimensional image capture devices.

BACKGROUND

Typical methods for non-contact capture of three-dimensional (3D) structure principally include conventional (dual-imager) stereo vision, laser ranging (e.g., scanning and flash light detection and ranging (LIDAR)), and structured light methods.

Conventional stereo vision is a well-established ranging method that typically estimates range to a scene through measurements of pixel offsets between images of the same object taken simultaneously from two spatially separated cameras. The principal disadvantages of conventional stereo are the need for a second imager and the increased size and power requirements. In particular, it is generally impractical to convert the existing installed base of single-camera devices, such as smartphones or tablets, into stereo cameras due to the challenges associated with integrating a second camera.

Laser ranging methods, such as LIDAR, typically employ the time-of-flight principle to determine range to objects. For example, the LIDAR sensor emits light pulses, receives reflected energy from the object of interest, and calculates distance through precise time of flight measurements. As active illumination sensors, LIDARs are relatively large (typically greater than 2 cu-in), power-intensive (typically greater than 10 W), and expensive. More distant objects require higher illumination power, thus further driving up the size and power consumption of the sensor. They are also not easily integrated into existing/ubiquitous platforms such as smartphones and tablets.

Structured light techniques typically employ a single camera together with a physically separated laser/illuminator that projects a pattern on to the object to be measured. The position and shape of the pattern indicates surface profile shape and location. As with LIDAR, collecting 3D images, particularly at longer ranges and outdoors, requires considerable laser power, thus rendering this approach impractical.

As such, a need exists for improved systems and methods for converting conventional imaging devices into 3D cameras.

SUMMARY OF THE INVENTION

Unlike existing methods for 3D capture, embodiments of the present invention provide a practical means to convert a conventional imager-enabled device (such as a smartphone, tablet, digital single-lens reflex (SLR) camera, video camera, movie camera, or any other device incorporating an image sensor) into a 3D camera. In various embodiments, the invention is a thin, passive optical assembly/apparatus that is placed and/or attached over an existing camera lens. It effectively replicates a stereo camera pair by channeling light from two apertures onto a partitioned single imager.

By using a flat dual-aperture optical assembly together with the native imager on the host device (e.g., smartphone, tablet, digital camera, etc.), a stereo camera capability is produced with no additional active hardware and only a modest increase on overall host device size. Importantly, the concept utilizes lensed relay optics, with intermediate image planes, enabling long focal length optics for higher precision 3D imaging.

Accordingly, in one aspect, an optical assembly for three-dimensional image capture includes first and second optical channels fixed with respect to one another, with each channel being configured to direct light onto at least a portion of an image sensor. The first and second optical channels each include an aperture for receiving the light, an objective lens for focusing the light into an intermediate image on an intermediate image plane, and an eyepiece lens for collimating the intermediate image.

In one embodiment, each channel further includes a first reflector angled to direct the light from the aperture toward the objective lens. The first reflector may direct the light toward one half of the objective lens.

In another embodiment, each channel further includes a second reflector angled to direct the light toward the image sensor. In particular, the second reflector in the first optical channel may direct the light toward one half of the image sensor, and the second reflector in the second optical channel may direct the light toward the other half of the image sensor.

The optical assembly may exist in a variety of configurations. For example, in one implementation, the intermediate image plane is disposed between the objective lens and the eyepiece lens, and the eyepiece lens may be disposed between the objective lens and the second reflector. In another embodiment, the intermediate image plane is disposed between the second reflector and the eyepiece lens, and the eyepiece lens may be disposed between the second reflector and the image sensor.

In yet another embodiment, the apertures of the first and second optical channels are coplanar. The first and second optical channels may share the eyepiece lens, which may be disposed on a plane parallel to the aperture plane.

In further embodiments, the apertures of the first and second optical channels are disposed about a surface of a host device to form a substantially maximum baseline between the apertures. For example, in one embodiment, the apertures are disposed at two diagonal corners of the host device.

In another aspect, a method for capturing three-dimensional images with an optical assembly is disclosed. The assembly includes first and second optical channels that are fixed with respect to one another and are configured to direct light onto an image sensor. Light is received into an aperture for each optical channel. The light is focused into an intermediate image on an intermediate image plane using an objective lens, and an eyepiece lens is used to collimate the intermediate image. The light is ultimately directed onto at least a portion of the image sensor.

In one embodiment, the light in each channel is directed from the aperture toward the objective lens using a first reflector. The first reflector may direct the light toward one half of the objective lens.

In another embodiment, the light in each channel is directed toward the image sensor using a second reflector. The second reflector in the first optical channel may direct the light toward one half of the image sensor, and the second reflector in the second optical channel may direct the light toward the other half of the image sensor.

In one implementation, the intermediate image plane is disposed between the objective lens and the eyepiece lens, and the eyepiece lens may be disposed between the objective lens and the second reflector. In another embodiment, the intermediate image plane is disposed between the second reflector and the eyepiece lens, and the eyepiece lens may be disposed between the second reflector and the image sensor.

In yet another embodiment, the apertures of the first and second optical channels are coplanar. The first and second optical channels may share the eyepiece lens, which may be disposed on a plane parallel to the aperture plane In further embodiments, the apertures of the first and second optical channels are disposed about a surface of a host device to form a substantially maximum baseline between the apertures. For example, in one embodiment, the apertures are disposed at two diagonal corners of the host device.

These and other objects, along with advantages and features of embodiments of the present invention herein disclosed, will become more apparent through reference to the following description and claims. Furthermore, it is to be understood that the features of the various embodiments described herein are not mutually exclusive and can exist in various combinations and permutations.

BRIEF DESCRIPTION OF THE DRAWINGS

The accompanying drawings, which are included as part of the present specification, illustrate the presently preferred embodiments and, together with the general description given above and the detailed description of the preferred embodiments given below, serve to explain and teach the principles of the present invention.

FIG. 3 depicts an exemplary external configuration according to an embodiment.

DETAILED DESCRIPTION

In one embodiment, the present invention is a compact optical apparatus that transforms a conventional camera, as found on modern cell phones, smartphones, PCs, tablets, webcams, digital cameras, and other devices having electronic imaging sensors, into a "3D camera" for non-contact 3D image and/or video capture.

Embodiments of the invention feature dual, long-focal-length, intermediate-image optical streams from two apertures directed onto a single imager. Passive acquisition of millimeter-level 3D resolution stereo imagery is accomplished through the long focal length of the channels and the spacing of the apertures to maximize a baseline distance between the apertures. The optical channels project images onto a single sensor focal plane, thereby avoiding the use of two separate cameras and greatly simplifying calibration procedures. The use of relay optics (intermediate image planes) facilitates the direction of the light onto the single image sensor and advantageously provides for longer focal length configurations. Notably, the invention provides numerous advantages over devices with short focal length lenses and/or baselines, including increased magnification and the ability to perform stereoscopic ranging for more distant objects in a field of view.

Figure 1A:
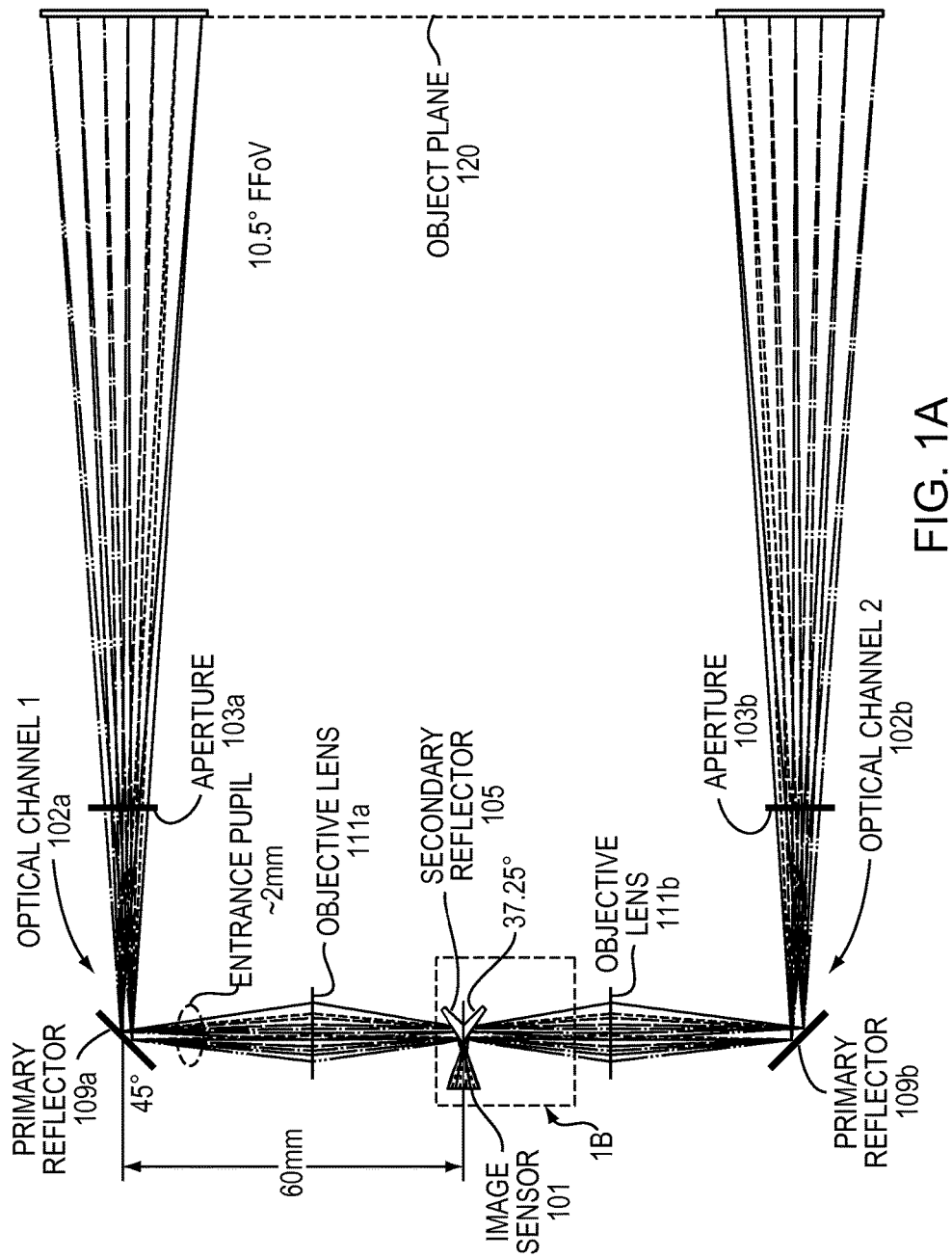
FIG. 1A is an optical ray trace diagram according to an embodiment.

Referring to FIG. 1A, the optical assembly enables stereoscopic imaging from a single embedded imager 101 (i.e., image sensor) in a host device. The assembly includes at least two separate imaging-optic channels 102a and 102b that are fixed with respect to each other. Each channel collects target imagery onto a portion of the imaging sensor 101. A 3D range model can then be constructed from the image disparity introduced by the parallax in the views. Through the use of multiple lens elements and an intermediate image plane, the focal length of the stereo imager can be dramatically increased for high-precision 3D imaging.

In one embodiment, the assembly channels two distinct light paths from a pair of spatially-separated apertures 103a and 103b. The apertures may be substantially co-planar. As illustrated in FIG. 1A, the light ray bundles entering the apertures 103a and 103b represent a subset of sampled positions along the object plane 120. Referring to optical channel 102a, as the light enters the channel 102a through aperture 103a, it is directed by primary reflector 109a (e.g., an angled mirror) into objective lens 111a. In this embodiment, the light entering optical channel 102b through aperture 103b follows a similarly-constructed path, being directed by primary reflector 109b into objective lens 111b.

Figure 1B:
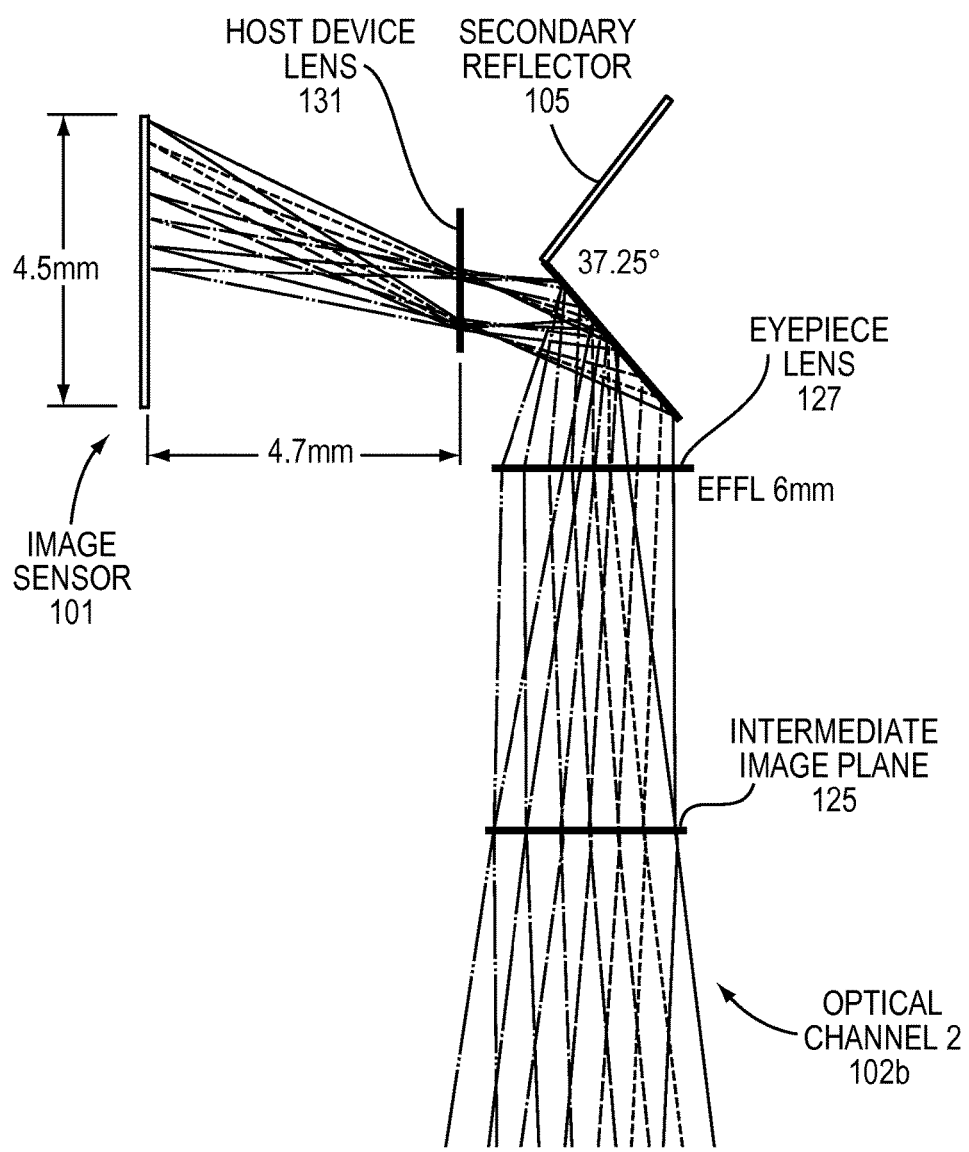
FIG. 1B is an optical ray trace diagram with a detailed view of the exit end of an optical channel from FIG. 1A.

As illustrated in FIG. 1B, light exiting objective lens 111b is focused into an intermediate image on an image plane 125 in the path of the light. Proceeding further along the light path, the light enters eyepiece lens 127 which collimates the intermediate image. The light is then directed by secondary reflector 105 (e.g., a faceted prism mirror) through the camera lens 131 of the host device and onto the image sensor 101. Of note, both light paths in optical channels 102a and 102b intersect at the faceted reflector 105, which directs the paths onto two separate halves of the host device's image sensor 101. As a result, the surface of the sensor 101 is effectively split, with each of the two light paths occupying half the area of the sensor 101. Of note, because the eyepiece lens 127 functions in a similar fashion to an eyepiece in, for example, a typical viewing telescope, it is referred to herein as an "eyepiece lens" although it is not intended to interface with a human eye. Instead, the eyepiece lens 127 provides a connection between the optical assembly and the image sensor by collimating the intermediate image from the objective lens 111a and/or 111b for relay to the image sensor 101. The lens of the host imaging device then provides a function similar to the ocular lens of the human eye as the light is directed through it.

Stereo vision algorithms developed for conventional dual-imager stereo vision systems execute on the onboard processor of the host device to form a 3D image from the visual input. Alternatively or in addition, the unprocessed and/or partially processed image data captured by the image sensor 101 may be transmitted to a separate device for execution of the algorithms and returned to the host device for further processing or as fully-formed 3D images. These algorithms are well-known to those having ordinary skill in the relevant art.

Note that the properties of the lenses and mirrors, the positions and distances between components, the number of optical channels and components, and so on may vary based on or independent of the device to which the assembly is attached. For example, the angle of the secondary mirror 105 and the distance to the image sensor 101 may vary to accommodate differently sized or positioned image sensors. In other embodiments, the order of the components along each optical channel 102a and 102b may differ, and there may be different, and/or additional or fewer components.

The optical channels 102a, 102b may include separate and/or shared components. For example, in some embodiments, the secondary reflector 105 comprises two separate reflectors. In other embodiments, a single eyepiece lens 127 is shared by the optical channels 102a and 102b rather than having one eyepiece lens per channel. Further, the optical channels 102a and 102b need not be symmetrically configured, as shown in the figures but, instead, may include various asymmetrical configurations or different components to adapt to the particular properties of the host device. One skilled in the art will recognize the variations in configuration that are possible while still recognizing the goals of the present invention.

Figure 2:
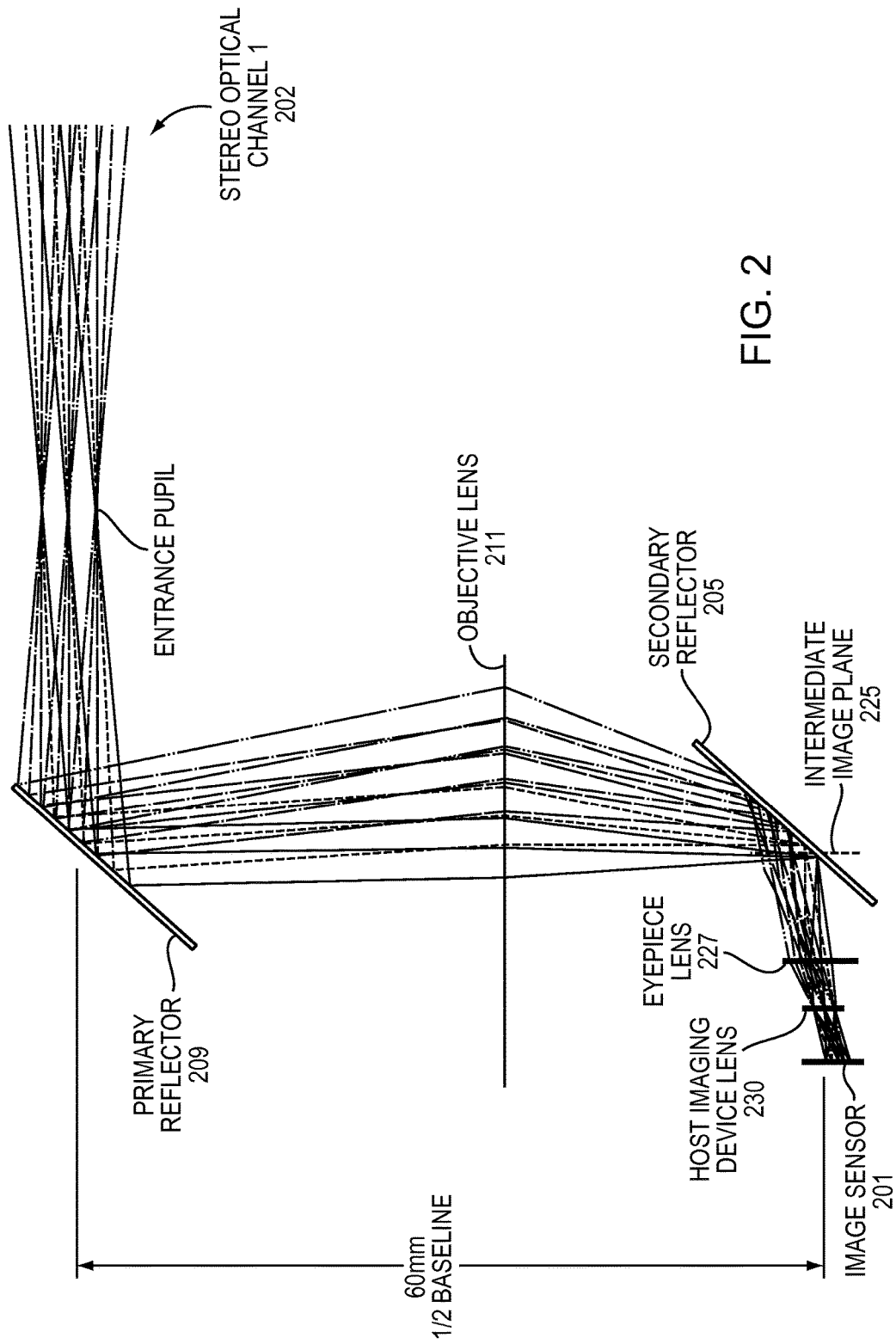
FIG. 2 is an optical ray trace diagram according to an embodiment.

FIG. 2 illustrates in detail the operation of an individual optical channel 202 in another embodiment of the invention. After light enters the channel 202, it is directed by primary reflector 209 into objective lens 211, which causes an intermediate image to be focused onto an image plane 225 in the path of the light. In this embodiment, the primary reflector 209 directs the light so that only half of the objective lens 211 interacts with the wavefront. In other embodiments, however, the wavefront of the light interacts with substantially all or any portion of the objective lens 211.

Depending on the properties of the objective lens 211, the intermediate image plane 225 may be disposed prior or subsequent to the reflection of the light by a secondary reflector 205. In the embodiment depicted in FIG. 2, the intermediate image is formed following redirection of the light by the secondary reflector 205. Continuing further, the light enters eyepiece lens 227, which collimates the image. The lights then passes through the lens 230 of the host imaging device (e.g., cell phone camera, tablet camera, etc.), which images the object field onto the image sensor 201.

The second optical channel may be configured similarly to the first optical channel 202, and may include its own primary reflector and objective lens. The paths of the two optical channels intersect at the secondary reflector 205, which directs the light into the single eyepiece lens 227. In this manner, the full apertures of the eyepiece lens 227 and the imaging device lens 230 interact with the combined light output of the optical channels.

Referring now to FIG. 3, an exemplary enclosure of the 3D imaging apparatus 300 is shown as separated from and attached to a tablet device 310. The optical apertures 315 through which light enters the optical channels of the apparatus 300 are positioned at opposite diagonal corners of the tablet 310 footprint, providing a maximum or substantially maximum baseline distance between the apertures 315 and increased 3D resolution. The apparatus 300 is positioned over the camera 325 of the tablet device 310 such that the aperture through which light exits the apparatus 300 is directed through the lens of the camera 325.

One skilled in the art will recognize that the enclosure 300 and the arrangement of the components within may take various forms to accommodate the shape and camera position of various types of smartphones, tablets, webcams, computing devices, and the like. In some of these embodiments, the enclosure 300 may be constructed such that the light entry apertures are on or about the surface of the host device in one or more planes such that a baseline distance between the apertures is substantially maximized. For example, for a rectangular device such as a tablet or smartphone device, the apertures may be positioned on opposite diagonal corners of the device. If the structure of the enclosure 300 and/or the host device limits the extent to which a maximum baseline between the apertures can be achieved, the apparatus 300 may be configured to have a near-optimal, or substantially maximum, baseline distance.

In some embodiments, when placed on a host device, the enclosure 300 does not extend beyond one or more dimensions of the device. For example, and as shown in FIG. 3, the enclosure 300 does not extend beyond the width and height of the tablet device 310, and adds only to the total thickness. However, in some embodiments, the enclosure 300 is configured to extend beyond the height, width, and/or depth of the host device in order to extend the baseline distance between the apertures. The enclosure 300 may, for example, be affixed to an edge of the host device, and/or envelop all or a portion of the host device.

In some embodiments, the 3D imaging apparatus 300 incorporates flat optical components such that a minimal thickness and low-profile design is maintained throughout. The apparatus 300 may be affixed to a host device by tension or any suitable fastening device, such as clips, magnets, Velcro, and the like.

The optimal positions and properties of the lenses and reflectors incorporated in the apparatus 300 may vary as necessary to accommodate the characteristics of the imaging sensor in the host device to which the apparatus 300 is attached. In one exemplary embodiment (as shown in FIGS. 1A and 1B), the apertures 103a and 103b are positioned to form a baseline of 120 mm, the primary reflectors 109a and 109b are fixed at 45° angles, and the facets of the secondary (prism) reflector 105 are angled at 37.25°. The components of the apparatus are sized and positioned to accommodate the rectangular image sensor 101 having a side measuring approximately 4.5 mm, with a distance of approximately 4.7 mm between the sensor 101 and the camera lens 131 of the host device. Further, in some embodiments, a minimal spacing (e.g., approximately 1.6 mm) between the apex of the secondary reflector 105 and the camera lens 131 is desirable to limit the dead-band zone of the reflector 105.

Various commercial off-the-shelf lenses and other components can be incorporated in the apparatus. For example, the objective lens may be a spherical plano-convex lens, such as model PLCX-19.1-56.7-C available from CVI-Melles Griot, having an effective focal length of 110.1 mm and an entrance pupil diameter of 16.23 mm. The eyepiece lens may also be a plano-convex lens, such as stock no. 32-001 available from Edmund Optics, having an effective focal length of 27.0 mm and an entrance pupil diameter of 18.00 mm.

Embodiments of the optical apparatus described herein feature a number of practical applications. For example, the apparatus can be used for defense and physical security applications such as vision-aided navigation and mapping, including the generation of paths and 3D point clouds during passage through GPS-denied areas. Forensics applications range from recreation of a crime or accident scene to performing battle damage assessment. The apparatus may be used as a biometrics device to identify personnel and/or vehicles/equipment by both a visual and 3D signature. Another use of the 3D imaging apparatus is as a portable targeting system for determining the location of targets of interest. Specifically, the apparatus may be used to call in fire from mounted/dismounted soldiers or an unmanned platform. Further uses include mission planning using virtual walkthroughs of video streams that are collected pre-mission, training applications using collected imagery to produce a virtual, highly realistic world, and determining changes in a scene that require closer inspection/investigation.

The present invention further provides for a variety of civil and commercial applications. For example, the optical apparatus may include capabilities similar to Google® Street View, but may be enhanced to include a 3D structure of the viewed scene. Topographic maps may be formed using image data captured through the device, and the locations of features in an environment such as buildings (dimensions and locations), municipal structures (e.g., roadway features, utilities structures, natural features) may be captured as well. In another example, the apparatus may be used to take measurements of rooms, building sites, and other built/buildable spaces, and to produce measured floor plans and virtual tours of buildings. Further, the apparatus may be used to virtually inspect/review a product for sale.

The 3D optical imager may have further consumer, gaming, and entertainment applications. For example, the imager may be used to control vehicles and other devices through motion sensing (e.g., in a manner similar to the Microsoft® Kinect® system). For gaming consoles, computers, and other devices having image sensors, the invention may be used to transform the image sensors into 3D image capture devices and provide for the recognition of the position and orientation of objects (e.g., body parts, controllers, etc.) in front of the sensor.

Having described certain embodiments of the invention, it will be apparent to those of ordinary skill in the art that other embodiments incorporating the concepts disclosed herein may be used without departing from the spirit and scope of the invention. For example, the apparatus may be configured to capture 3D images at wavelengths other than visible light, such as infrared, in conjunction with a host device having the appropriate sensor. Accordingly, the described embodiments are to be considered in all respects as only illustrative and not restrictive.

What is claimed is:

1. An optical assembly for three-dimensional image capture, the assembly comprising:
   an enclosure having disposed therein first and second optical channels fixed with respect to one another and configured to direct light onto at least a portion of an image sensor disposed in a host device separate from the assembly to produce a stereoscopic image, each channel comprising:
   an aperture for receiving the light;
   an objective lens for focusing the light into an intermediate image on an intermediate image plane;
   a primary reflector angled to direct the light passed through the aperture to the objective lens;
   a secondary mirror angled to direct the light that has been focused by the objective lens onto at least a portion of the image sensor disposed in the host device; and
   an eyepiece lens for collimating the intermediate image, the eyepiece lens being disposed between the objective lens and the secondary mirror,
   wherein the assembly is configured for coupling to the host device to dispose the apertures of the first and second optical channels about a surface of the host device, the coupling causing a light exit aperture formed in the enclosure of the assembly to become aligned over the image sensor disposed in the host device.

2. The optical assembly of claim 1, wherein the primary reflector directs the light toward a half of the objective lens.

3. The optical assembly of claim 1, wherein a first surface of the secondary mirror in the first optical channel directs the light toward a first half of the image sensor, and wherein a second surface of the secondary mirror in the second optical channel directs the light toward a second, different half of the image sensor.

4. The optical assembly of claim 1, wherein the intermediate image plane is disposed between the objective lens and the eyepiece lens.

5. The optical assembly of claim 1, wherein the apertures of the first and second optical channels are coplanar.

6. The optical assembly of claim 5, wherein the first and second optical channels share the eyepiece lens, and wherein the eyepiece lens and the apertures of the first and second optical channels are disposed on parallel planes.

7. The optical assembly of claim 1, wherein the assembly is configured to dispose the aperture of the first optical channel at a first corner of the host device and dispose the aperture of the second optical channel at a second corner of the host device, the first corner diagonal with respect to the second corner.

8. The optical assembly of claim 1, wherein the enclosure is dimensioned to form a substantially maximum baseline between the apertures of the first and second optical channels when the assembly is coupled to the host device.

9. The optical assembly of claim 1, wherein the objective lens is a plano-convex lens.

10. The optical assembly of claim 1, wherein a reflective surface of the primary reflector is disposed at an angle relative to a reflective surface of the secondary mirror.

11. The optical assembly of claim 1, wherein reflective surfaces of the secondary mirror are flat.

12. The optical assembly of claim 1, wherein light paths of the first and second optical channels intersect at the secondary mirror.

13. A method for capturing three-dimensional images with an optical assembly, the assembly comprising an enclosure having disposed therein first and second optical channels fixed with respect to one another and configured to direct light onto an image sensor disposed in a host device separate from the assembly to produce a stereoscopic image, the method comprising:
   coupling the assembly to the host device to dispose apertures of the first and second optical channels about a surface of the host device and cause a light exit aperture formed in the enclosure of the assembly to become aligned over the image sensor disposed in the host device; and
   for each optical channel:
   receiving light into the optical channel through an aperture disposed on the assembly;
   directing the light after being received into the optical channel to an objective lens with a primary reflector;
   focusing the light into an intermediate image on an intermediate image plane using the objective lens;
   directing the light after being focused by the objective lens onto at least a portion of the image sensor disposed in the host device with a secondary mirror; and
   collimating the intermediate image using an eyepiece lens disposed one of between the objective lens and the secondary mirror or between the secondary mirror and the image sensor.

14. The method of claim 13, wherein the primary reflector directs the light toward a half of the objective lens.

15. The method of claim 13, wherein a first surface of the secondary mirror in the first optical channel directs the light toward a first half of the image sensor, and wherein a second surface of the secondary mirror in the second optical channel directs the light toward a second, different half of the image sensor.

16. The method of claim 13, wherein the intermediate image plane is disposed between the objective lens and the eyepiece lens.

17. The method of claim 13, wherein the intermediate image plane is disposed between the secondary mirror and the eyepiece lens.

18. The method of claim 13, wherein the apertures of the first and second optical channels are coplanar.

19. The method of claim 18, wherein the first and second optical channels share the eyepiece lens, and wherein the eyepiece lens and the apertures of the first and second optical channels are disposed on parallel planes.

20. The method of claim 13, further comprising disposing the aperture of the first optical channel at a first corner of the host device and disposing the aperture of the second optical channel at a second corner of the host device, the first corner diagonal with respect to the second corner.

21. The method of claim 13, further comprising disposing the apertures of the first and second optical channels about a surface of the host device to form a substantially maximum baseline between the apertures.

22. An optical assembly for three-dimensional image capture, the assembly comprising:

an enclosure having disposed therein first and second optical channels fixed with respect to one another and configured to direct light onto at least a portion of an image sensor disposed in a host device separate from the assembly to produce a stereoscopic image, each channel comprising:
an aperture for receiving the light;
an objective lens for focusing the light into an intermediate image on an intermediate image plane;
a primary reflector angled to direct the light passed through the aperture to the objective lens;
a secondary mirror angled to direct the light that has been focused by the objective lens onto at least a portion of the image sensor disposed in the host device; and
an eyepiece lens for collimating the intermediate image, the eyepiece lens being disposed between the secondary mirror and the image sensor,
wherein the assembly is configured for coupling to the host device to dispose the apertures of the first and second optical channels about a surface of the host device, the coupling causing a light exit aperture formed in the enclosure of the assembly to become aligned over the image sensor disposed in the host device.

23. The optical assembly of claim 22, wherein the intermediate image plane is disposed between the secondary mirror and the eyepiece lens.

* * * * *